US012731931B2

(12) United States Patent
Benham

(10) Patent No.: US 12,731,931 B2
(45) Date of Patent: Sep. 8, 2026

(54) BREAKAWAY POWER CONNECTOR

(71) Applicant: Winchester Interconnect Corporation, Norwalk, CT (US)

(72) Inventor: John E. Benham, Torrington, CT (US)

(73) Assignee: WINCHESTER INTERCONNECT CORPORATION, Norwalk, CT (US)

( * ) Notice: Subject to any disclaimer, the term of this patent is extended or adjusted under 35 U.S.C. 154(b) by 327 days.

(21) Appl. No.: 18/122,003

(22) Filed: Mar. 15, 2023

(65) Prior Publication Data

US 2024/0313461 A1 Sep. 19, 2024

(51) Int. Cl.
*H01R 13/20* (2006.01)

(52) U.S. Cl.
CPC .................................... *H01R 13/20* (2013.01)

(58) Field of Classification Search
None
See application file for complete search history.

(56) References Cited

U.S. PATENT DOCUMENTS 2,761,111 A 8/1956 Klostermann
6,267,602 B1 7/2001 Mendelson et al.
7,351,066 B2 * 4/2008 DiFonzo ............ H01R 13/6205 439/39
7,726,973 B1 6/2010 Perry
7,789,690 B1 * 9/2010 Rhein .................. H01R 13/707 439/352
8,496,494 B2 * 7/2013 Jordan ............... H01R 13/6277 439/680
9,362,664 B2 6/2016 Yen
11,374,351 B2 * 6/2022 Storione .............. H01R 13/521
2002/0160629 A1 10/2002 Lau et al.
2024/0145978 A1 * 5/2024 Yokoyama ........... H01R 24/542

OTHER PUBLICATIONS

Bayer, "Snap-Fit Joints for Plastics," Bayer MaterialScience (downloaded from https://fab.cba.mit.edu/classes/S62.12/people/vernelle.noel/Plastic_Snap_fit_design.pdf on Mar. 8, 2023) (26 pages).
Partial Extended European Search Report issued in European Application No. 24158121.4 dated Nov. 21, 2024 (9 pages).
Non-Final Office Action issued in U.S. Appl. No. 29/872,663 on Sep. 5, 2024 (47 pages).
Non-Final Office Action issued in U.S. Appl. No. 29/872,664 on Sep. 19, 2024 (53 pages).
Non-Final Office Action issued in U.S. Appl. No. 18/403,511 on Mar. 17, 2026 (16 pages).
Final Office Action issued in U.S. Appl. No. 18/403,511 on Jun. 23, 2026 (19 pages).

* cited by examiner

*Primary Examiner* — Vanessa Girardi
(74) *Attorney, Agent, or Firm* — Rothwell, Figg, Ernst & Manbeck, P.C.

(57) ABSTRACT

A breakaway power connector. The breakaway power connector includes a panel mount connector and a plug connector configured to mate with the panel mount connector. The plug connector and the panel mount connector are configured such that when the plug connector is fully mated with the panel mount connector i) the minimum lateral force needed to laterally unmate the plug connector from the panel mount connector is X pounds (lbs) and ii) the minimum axial force needed to axially unmate the plug connector from the panel mount connector is Y pounds (lbs), and X<Y.

17 Claims, 5 Drawing Sheets

BREAKAWAY POWER CONNECTOR

TECHNICAL FIELD

Disclosed are embodiments related to a breakaway power connector.

BACKGROUND

The National Electrical Manufacturer's Association (NEMA) set of standards is by far the most popular set of standards used in America and Canada for the construction of power cords and their respective connections. Breakaway connectors typically are offered in a cable-to-cable termination, an axial pull will disengage at a predetermined force. Any lateral disengagement will damage the mated connectors. This is type of connector cannot be used on a mounted or fixed connector such as a panel mount. A standard NEMA style blade contact requires an axial pull to disengage the female plug from the male socket.

SUMMARY

Certain challenges presently exist. For example, a lateral disengagement of a plug from the socket may damage the plug and socket and may create a danger of exposed conductors and potential electrical shock. To overcome these issues, this disclosure provides a breakaway power connector (with or without data signal contacts) that can pivot and disconnect at a predetermined force with either an axial or lateral disengagement path.

Accordingly, in one aspect, there is provided a breakaway power connector that includes a panel mount connector and a plug connector configured to mate with the panel mount connector. The plug connector and the panel mount connector are configured such that when the plug connector is fully mated with the panel mount connector i) the minimum lateral force needed to laterally unmate the plug connector from the panel mount connector is X pounds (lbs) and ii) the minimum axial pull force needed to axially unmate the plug connector from the panel mount connector is Y pounds (lbs), and X<Y.

An advantage of the embodiments disclosed herein is that they can be used in environments where the plug is connected to a mobile object (e.g., hospital bed) that may need to be moved unexpectedly for an emergency without damaging or restricting the ability to rapidly relocate.

BRIEF DESCRIPTION OF THE DRAWINGS

The accompanying drawings, which are incorporated herein and form part of the specification, illustrate various embodiments.

DETAILED DESCRIPTION

Figure 1:
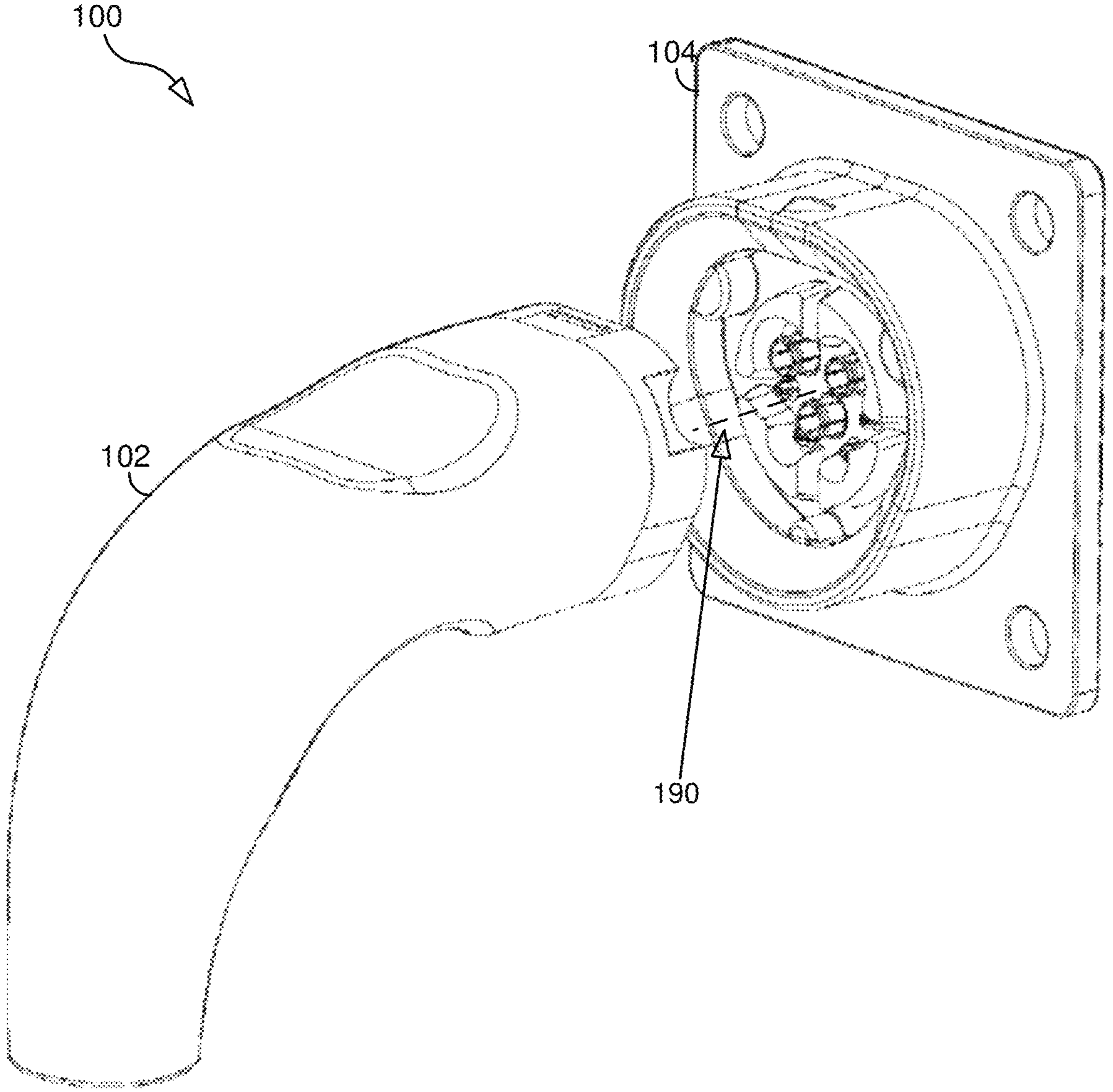
FIG. 1 illustrates a breakaway power connector according to some embodiments.

FIG. 1 illustrates a breakaway power connector 100 according to an embodiment. Breakaway connector 100 includes a cable plug connector 102 configured to mate with a corresponding panel mount connector 104, which is configured to be mounted to a panel or circuit board or other surface.

Figure 2:
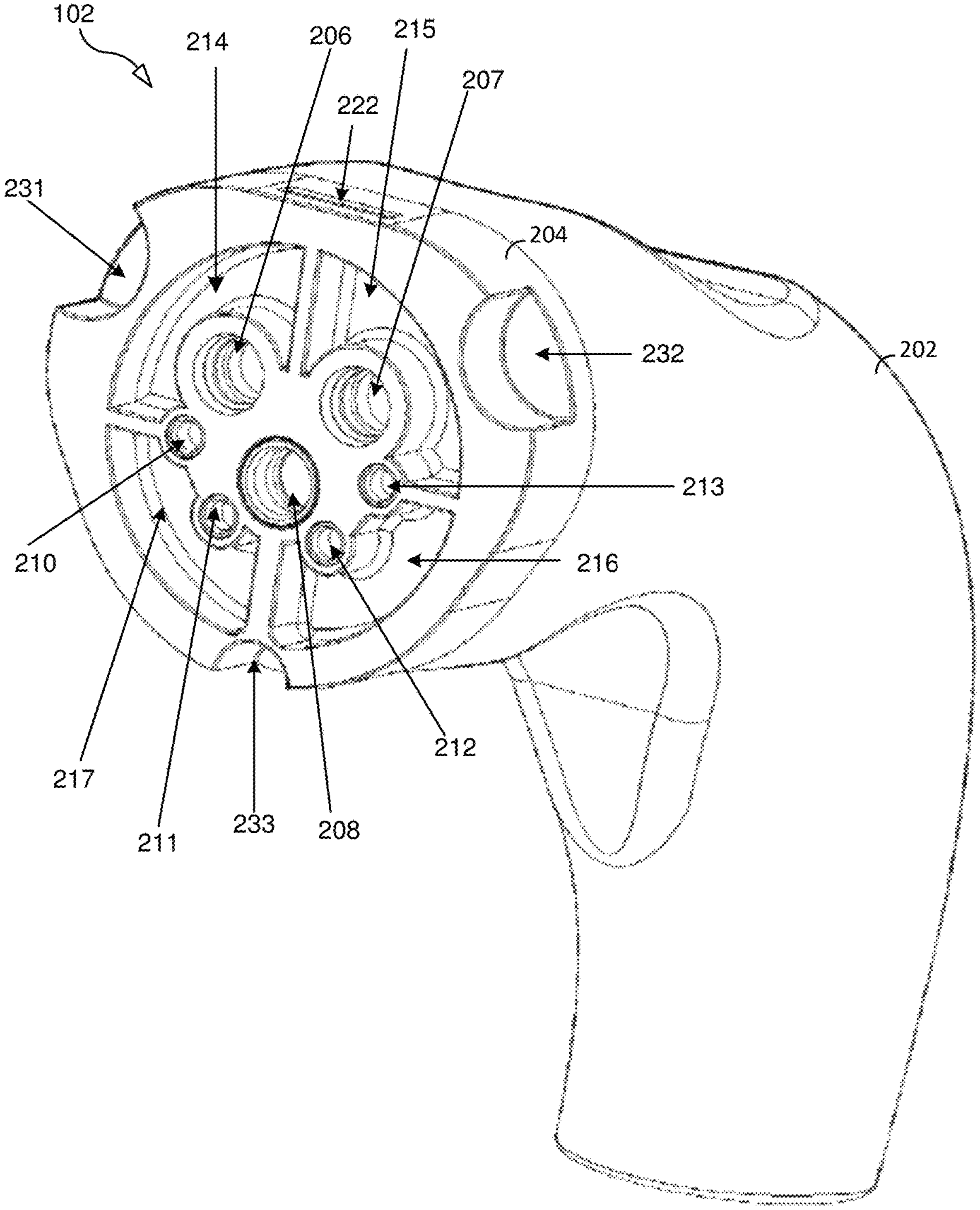
FIG. 2 illustrates a cable plug connector according to some embodiments.

FIG. 2 further shows cable plug connector 102. Cable plug connector 102 comprises a curved handle 202 and an insulator housing 204 at the distal end of handle 202. Insulator housing 204 houses female power contacts 206, 207, and 208, which are connected to a power cable housed within handle 202. Housing 204 also houses female signal contacts 210, 211, 212, and 213, which are connected to data cables housed within handle 202.

Insulator housing 204 has keying features to maintain alignment when plug 102 is mated with panel mount connector 104. More specifically, housing 204 has recesses 214, 215, 216 and 217 to receive corresponding boss features 341-344 (see FIG. 3) of the panel mount 104. In the embodiment shown, recesses 214-217 are curved, recess 214 partially surrounds power contact 206, recess 215 partially surrounds power contact 207, recess 216 partially surrounds signal contact 212, and recess 217 partially surrounds signal contact 211. There are also provided grooves 231, 232, and 233 on the outer surface of housing 204 for receiving corresponding bosses of panel mount connector 104. Insulator housing 204 supports direct over molding of the power cable to the insulator housing creating a sealed and reinforced bend relief for the cable. Additionally, there is provided a high contrast termination indicator 222.

Figure 3:
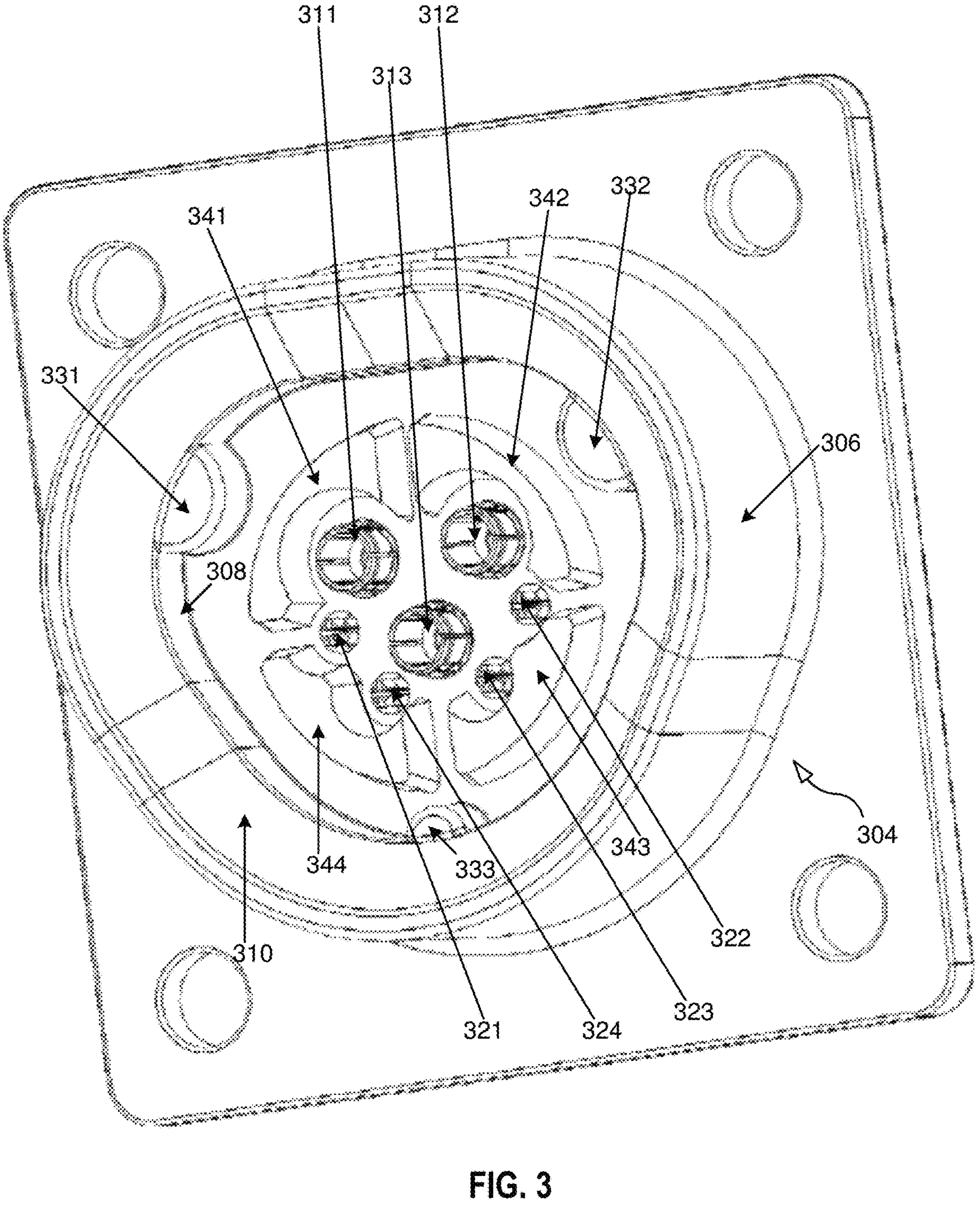
FIG. 3 illustrates a panel mount connector according to some embodiments.

FIG. 3 further shows panel mount connector 104. Panel mount connector 104 includes an insulator housing 304 that includes a generally circular outer wall 306 that surrounds a corresponding inner wall 308; a slanted surface 310 that extends from the top of outer wall 306 to top of inner wall 308. Surface 310 provides a lead-in feature that assists a user in correctly aligning plug 102 with contact 104 during mating. Disposed within the cavity defined by inner wall 308 are three male power contacts 311, 312, and 313 and four male signal contacts 321, 322, 323, and 324. Also disposed within the cavity are bosses 341, 342, 343, and 344, which not only provide protection to the contacts, but also engage with the above described corresponding curved recesses of plug 102 to limit rotation of the plug 102 relative to connector 104. In the embodiment shown, bosses 341-344 are curved to match the curvature of the corresponding recesses 214-217. Boss 341 partially surrounds power contact 311, boss 342 partially surrounds power contact 312, boss 343 partially surrounds signal contact 323, and boss 344 partially surrounds signal contact 324. Also disposed within the cavity are bosses 331, 332, and 333, which are designed to fit into grooves 231, 232, and 233 of plug 102, respectively. Bosses 331-333 and corresponding grooves 231-233 function to prevent rotation of plug 102 when plug 102 is mated with connector 104 and further function to align the power and signal contacts of plug 102 with the corresponding power and signal contacts of connector 104.

Figure 4:
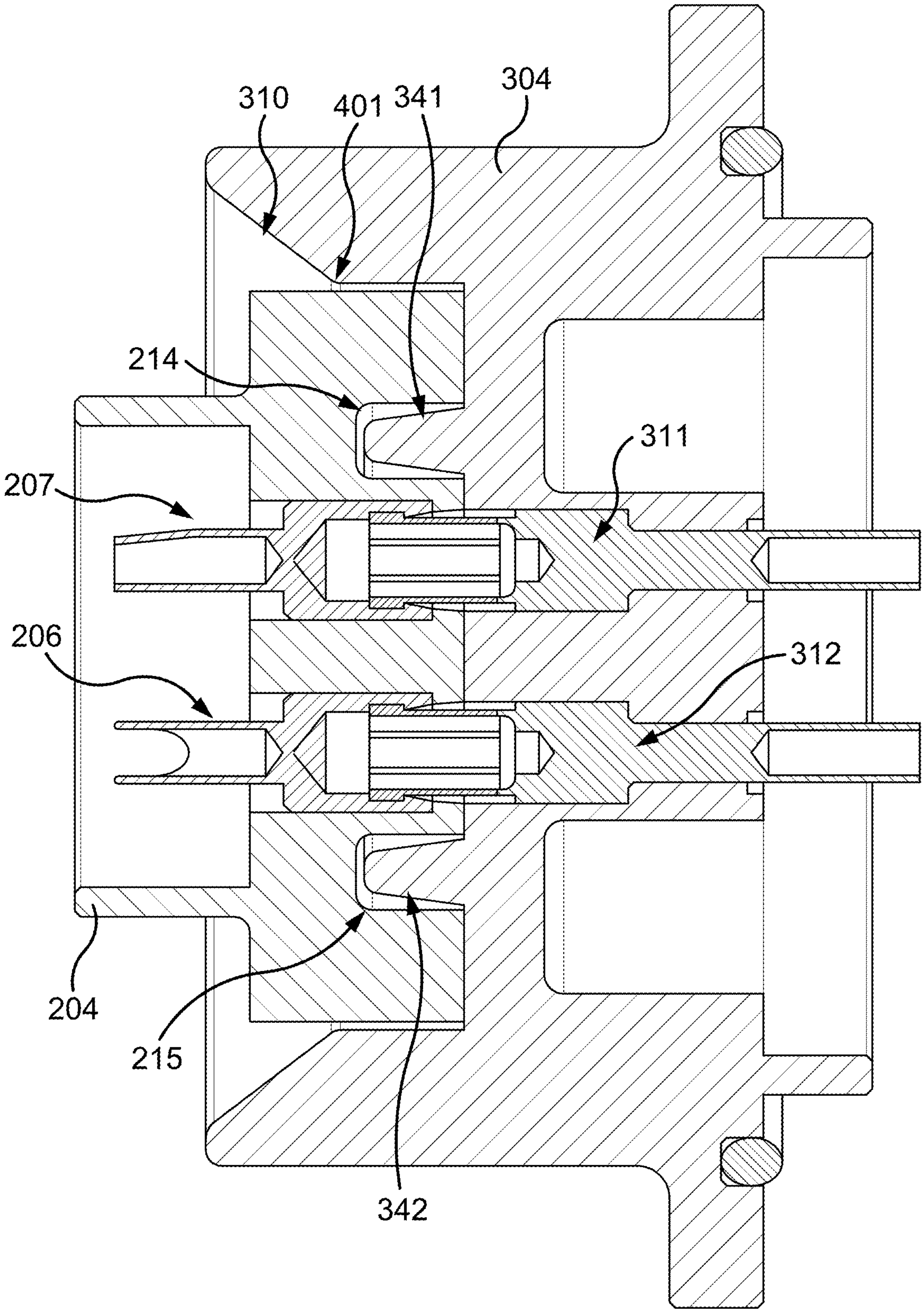
FIG. 4 is a cross-sectional view of the breakaway power connector according to some embodiments.
Figure 5:
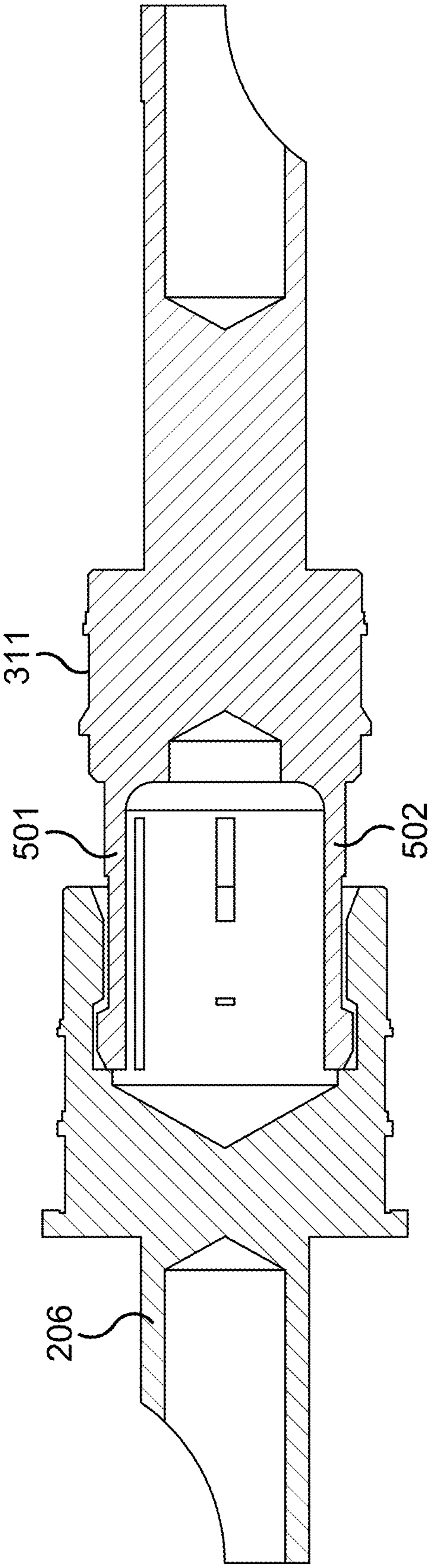
FIG. 5 is a cross-sectional view according to some embodiments.

FIG. 4 is a cross-sectional view of power connector 100 when plug 102 is mated with connector 104. FIG. 4 shows male power contacts 311 and 312 of connector 104 mated with female power contacts 206 and 207 of plug 102. FIG. 4 also shows recesses 214 and 215 of plug 102 receiving bosses 341 and 342 of connector 104. FIG. 4 further illustrates the lead-in feature (i.e., slanted surface 310) that extends from the top of outer wall 306 to the top of inner wall 308. In some embodiments, the height of inner wall 308 is between 0.12 and 0.17 inches, the height of outer wall 306 is between 0.25 and 0.35, and the inner wall is separated from the outer wall to create a 30 to 50 degree lead-in geometry. This geometry facilitates the lateral disengagement of plug 102 from connector 104. For example, the point at which the surface 310 meets the upper point of inner wall 308 functions as a pivot point 401 around which plug 102 rotates when lateral force is applied to plug 102. To further facilitate the lateral disengagement of plug 102 from connector 104, the power contacts 311-313 are 0.15 inches in diameter and engage with the corresponding female contacts 206-208 by 0.11 inches, as illustrated in FIG. 5, which shows cantilever arms 501 and 502 of contact 311 partially inserted into female contact 206.

In one embodiment, the geometry features described above create an axial retention force retaining the plug connector up to 25 lb and a lateral retention force retaining the plug connector of 12 lb. That is, for example, in one embodiment the minimum pull force needed to axially unmate the plug connector 102 from panel mount connector 104 is 25 lb—i.e., in this example 25 lbs is the minimum axial pull force needed to disengage the plug connector from the panel mount connector in a direction directly away from panel mount connector 104 along axial axis 190. The contacts are radially placed to the outer profile of the plug with a radial relationship to facilitate a disengagement path for the mated contacts and insulator housings. Free disengagement can occur with <0.025" positional mis-match of the umating path.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel. Further, as used herein "a" means "at least one" or "one or more."

The invention claimed is:

1. A breakaway power connector, comprising:
a panel mount connector; and
a plug connector configured to mate with the panel mount connector, wherein
the plug connector and the panel mount connector are configured such that when the plug connector is fully mated with the panel mount connector i) the minimum lateral force needed to laterally unmate the plug connector from the panel mount connector is X pounds (lbs) and ii) the minimum axial pull force needed to axially unmate the plug connector from the panel mount connector is Y pounds (lbs),
X<Y, and
the panel mount connector comprises an insulator housing that comprises:
a curved outer wall having a first height;
a curved inner wall having a second height that is less than the first height; and
a slanted surface that extends from a top of the curved outer wall to a top of the curved inner wall, wherein the curved outer wall surrounds the curved inner wall.

2. The breakaway connector of claim 1, wherein
X≤(Y/2).

3. The breakaway connector of claim 1, wherein
X is about 12, and
Y is about 25.

4. The breakaway connector of claim 1, wherein
the plug connector has a first female power contact,
the panel mount connector has a first male power contact configured to mate with the first female power contact,
the diameter of the first male power contact is about 0.15 inches, and
when the plug connector is fully mated with the panel mount connector the first male power contact engages with the first female power contact by not more than about 0.110 inches.

5. The breakaway connector of claim 1, wherein
the inner wall defines a cavity, and
disposed within the cavity defined by the inner wall are a plurality of male power contacts comprising a first male power contact and a second male power contact.

6. The breakaway connector of claim 1, wherein the plug connector comprises:
a curved handle; and
an insulator housing at an end of the curved handle.

7. The breakaway connector of claim 6, wherein the insulator housing houses a plurality of female power contacts connected to a power cable housed within the curved handle and the purality of female power contacts comprises a first female power contact and a second female power contact.

8. The breakaway connector of claim 7, wherein
the panel mount connector comprises a first boss and a second boss, and
the plug connector comprises a first recess configured to receive the first boss and a second recess configured to receive the second boss.

9. The breakaway connector of claim 8, wherein
the first recess is curved and partially surrounds the first female power contact, and
the second recess is curved and partially surrounds the second female power contact.

10. The breakaway connector of claim 9, wherein
the panel mount connector comprises a third boss and a fourth boss,
the insulator housing comprises a first groove on the outer surface of the insulator housing for receiving the third boss, and
the insulator housing further comprises a second groove on the outer surface of the insulator housing for receiving the fourth boss.

11. The breakaway connector of claim 10, wherein
disposed within a cavity defined by the inner wall are a plurality of male power contacts comprising a first male power contact and a second male power contact.

12. The breakaway connector of claim 11, wherein
the first boss is curved and partially surrounds the first male power contact, and
the second boss is curved and partially surrounds the second male power contact.

13. The breakaway connector of claim 11, wherein
the height of the inner wall is between 0.12 and 0.17 inches,
the height of the outer wall is between 0.25 and 0.35, and
the inner wall is separated from the outer wall to create a 30 to 50 degree lead-in geometry.

14. The breakaway connector of claim 13, wherein
a point at which the slanted surface meets an upper point of the inner wall functions as a pivot point around which the plug connector rotates when a lateral force is applied to the plug connector.

15. A panel mount connector for mating with a plug connector, the panel mount connector comprising:

an insulator housing comprising a generally circular outer wall that surrounds a corresponding inner wall and a slanted surface that extends from a top of outer wall to a top of the inner wall, wherein the insulator housing defines a cavity, a plurality of male power contacts are disposed within the cavity, the plurality of male power contacts comprising a first male power contact and a second male power contact, the height of the inner wall is between 0.12 and 0.17 inches, the height of outer wall is between 0.25 and 0.35, the inner wall is separated from the outer wall to create a 30 to 50 degree lead-in geometry, and a point at which the slanted surface meets an upper point of the inner wall functions as a pivot point around which the plug connector rotates when a lateral force is applied to the plug connector.

16. The panel mount connector of claim 15, further comprising:

a first curved boss disposed in the cavity, wherein the first curved boss partially surrounds the first male power contact, and a second curved boss disposed in the cavity, wherein the second curved boss partially surrounds the second male power contact.

17. The panel mount connector of claim 16, wherein the diameter of the first male power contact is about 0.15 inches and the diameter of the second male power contact is about 0.15 inches, and when the plug connector is fully mated with the panel mount connector, the first male power contact engages with a first female power contact of the plug connector by not more than about 0.110 inches, and the second male power contact engages with a second female power contact of the plug connector by not more than about 0.110 inches.

* * * * *